United States Patent [19]

Szreders et al.

[11] Patent Number: 4,827,606
[45] Date of Patent: May 9, 1989

[54] METHOD AND APPARATUS FOR ASSEMBLING SOLID OXIDE FUEL CELLS

[75] Inventors: Bernard E. Szreders, Oakdale, Conn.; Nicholas Campanella, O'Fallon, Mo.

[73] Assignee: The United States of America as represented by the United States Department of Energy, Washington, D.C.

[21] Appl. No.: 192,556

[22] Filed: May 11, 1988

[51] Int. Cl.⁴ .................... B23P 19/00; H01M 8/04
[52] U.S. Cl. .................................. 29/729; 429/31
[58] Field of Search ................ 29/729, 730, 623.1; 429/31, 30

[56] References Cited

U.S. PATENT DOCUMENTS

| | | | |
|---|---|---|---|
| 4,374,184 | 2/1983 | Somers et al. | 429/17 |
| 4,395,468 | 7/1983 | Isenberg | 429/31 |
| 4,431,715 | 2/1984 | Isenberg | 429/30 |
| 4,486,400 | 12/1984 | Riley | 423/592 |
| 4,490,444 | 12/1984 | Isenberg | 429/31 |
| 4,550,066 | 10/1985 | Alexander et al. | 429/191 |
| 4,567,031 | 1/1986 | Riley | 423/593 |

OTHER PUBLICATIONS

Zymbol, "Vapor Deposition of Stabilized Zirconium Oxide Electrolyte and Lanthanum Chromite Interconnection for Multiple Cell Fabrication", Westinghouse Electric Corporation, R & D Center, BNL 51728 Aug. 1983.

Jsenberg, "Growth of Refractory Oxide Layers by Electrochemical Vapor Deposition (EVD) at Elevated Temperatures", Proc. of the Sym. on Electrode Materials and Processes for Energy Conversion and Storage, ECS, Proc. vol. 77-6, 1977.

Merrigan and Keddy, "High Temperature Heat Pipes for Waste Heat Recovery", AIAA 15th Thermophysics Conference, Jul. 1980.

Lundberg "Silicon Carbide—Tungsten Heat Pipes for High-Temperature Service", Ind. Eng. Chem. Prod. Res. Dev. 1980 19,241-244.

Brule & Miller, "Performance Characteristics of Li/V-$_6$O$_{13+y}$ Cells in a Sulfolane Electrolyte", SAE Technical Paper, Series 1985.

Alexander & Riley, "The CuI-ZuI$_2$ System, Part 1: Synthesis and Ionic Conductivity", Mat. Res. Bull., vol. 19, pp. 1527-1534, 1984.

Primary Examiner—Anthony Skapars
Attorney, Agent, or Firm—Hugh W. Glenn; Robert J. Fisher; William R. Moser

[57] ABSTRACT

A plurality of jet air tubes are supported and maintained in a spaced matrix array by a positioning/insertion assembly for insertion in respective tubes of a solid oxide fuel cell (SOFC) in the assembly of an SOFC module. The positioning/insertion assembly includes a plurality of generally planar, elongated, linear vanes which are pivotally mounted at each end thereof to a support frame. The vanes, which each include a plurality of spaced slots along the facing edges thereof, may be pivotally displaced from a generally vertical orientation, wherein each jet air tube is positioned within and engaged by the aligned slots of a plurality of paired upper and lower vanes to facilitate their insertion in respective aligned SOFC tubes arranged in a matrix array, to an inclined orientation, wherein the jet air tubes may be removed from the positioning/insertion assembly after being inserted in the SOFC tubes. A rectangular compression assembly of adjustable size is adapted to receive and squeeze a matrix of SOFC tubes so as to compress the inter-tube nickel felt conductive pads which provide series/parallel electrical connection between adjacent SOFCs, with a series of increasingly larger retainer frames used to maintain larger matrices of SOFC tubes in position. Expansion of the SOFC module housing at the high operating temperatures of the SOFC is accommodated by conductive, flexible, resilient expansion, connector bars which provide support and electrical coupling at the top and bottom of the SOFC module housing.

14 Claims, 11 Drawing Sheets

METHOD AND APPARATUS FOR ASSEMBLING SOLID OXIDE FUEL CELLS

The United States government has rights in this invention pursuant to Subcontract No. 51232401 under Prime Contract No. W-31-109-ENG-38 among the U.S. Department of Energy, the University of Chicago and Combustion Engineering, Inc., of Stamford, Connecticut.

BACKGROUND OF THE INVENTION

This invention relates generally to solid oxide fuel power generators and is particularly directed to improvements in the assembly and coupling of solid oxide fuel cell modules.

There are several types of fuel cells currently being studied as possible alternatives for converting coal derived fuels to electricity. The three primary types of fuel cells under study are the phosphoric acid (PAFC), molten carbonate (MCFC), and solid oxide fuel cell (SOFC). The most important single factor in assessing the viability of an alternative power generating concept is its overall capital and operational cost to the user compared to the cost of conventional power generating systems. A number of factors affecting the economics of power generation based upon the fuel cell need to be considered in evaluating the commercial viability of a given fuel cell approach. One of the primary factors to be considered is the capital cost of the power generating unit of the system. The present invention is directed to a low cost SOFC matrix and modules.

The modular SOFC system is considered to be one of the viable technologies for future commercial installations. In its simplest form, an SOFC modular system is comprised of an array of ceramic based fuel cell tubes connected in series and further includes parallel configurations having the necessary fuel and air manifolds, plenum exhaust outlets, electrical interconnects, etc. All such fuel cells further include cathode, electrolyte and anode layers which are deposited upon a porous support tube with an interconnecting strip to form series and parallel electrical connections.

Such cells or stacks of cells operate at high temperatures to directly convert chemical energy of a fuel into direct current electrical energy by electrochemical combustion. This type of fuel cell utilizes a natural or synthetic fuel gas such as those containing hydrogen, carbon monoxide, methane and an oxidant such as oxygen or air. A typical SOFC reacts hydrogen fuel with oxygen from air to produce electrical energy, water vapor and heat. Cell operating temperatures are typically in the range of from 700° to 1100° C. Each cell contains an electrolyte in solid form which serves to insulate the cathode and anode from one another with respect to electron flow, but permits oxygen ions to flow from the cathode to the anode. The hydrogen reaction on the anode with oxide ions generates water with the release of electrons; and the oxygen reaction on the cathode with the electrons effectively forms the oxide ions. Electrons flow from the anode through an appropriate external load to the cathode, and the circuit is closed internally by the transport of oxide ions through the electrolyte.

However, even the modular SOFC system presents a substantial challenge to the fuel cell designer in developing a commercially feasible fuel cell. For example, state of the art SOFC generator tubes are individually capable of producing only a very small amount of power resulting in the necessity to combine substantial numbers of SOFC tubes in a matrix array, i.e., on the order of a 14×14 SOFC tube matrix, so as to form a 196 cell module capable of outputting 50 w. These modules may be arranged in a large number of parallel linear arrays so as to form a matrix of SOFC modules capable of producing as much as 10 Mw or more. The details of the design of each of the SOFC modules together with the large number of components associated therewith demand highly efficient fabrication techniques and economical assembly procedures of the SFC modules if this approach is to be commercially feasible.

The present invention addresses the prior art problems of SOFC fabrication by facilitating the assembly of SOFC tubes and jet air tubes in a tightly compacted matrix prior to insertion of the matrix in the closed housing of an SOFC module. The present invention facilitates the assembly of large numbers of SOFC tubes in a matrix array wherein adjacent SOFC tubes are electrically coupled together in a densely packed matrix which affords high power density in the SOFC. The present invention also contemplates an improved arrangement for electrically and mechanically coupling adjacent SOFC modules arranged in a linear stacked array.

OBJECTS AND SUMMARY OF THE INVENTION

Accordingly, it is an object of the present invention to provide an improved method and apparatus for assembling solid oxide fuel cell (SOFC) modules.

Another object of the present invention is to facilitate the insertion of each of a plurality of aligned air jet tubes into a respective one of a plurality of SOFC tubes arranged in a matrix array in fabricating an SOFC module.

It is another object of the present invention to provide an improved arrangement for mechanically and electrically coupling SOFC modules arranged in a stacked array.

A further object of the present invention is to provide apparatus for maintaining a plurality of SOFC air jet tubes in a matrix array and in parallel alignment for insertion within respective ones of a plurality of SOFC tubes in fabricating an SOFC module.

This invention contemplates a method and apparatus for assembling an SOFC module having a plurality of SOFC tubes electrically coupled in series or in parallel by means of compressive conductive pads disposed between immediately adjacent tubes, the method comprising: arranging the SOFC tubes in a loose matrix array with a conductive pad disposed between and in contact with each adjacent pair of SOFC tubes; forming the SOFC tubes into a tight matrix by compressing each of the conductive pads disposed between adjacent SOFC tubes; inserting the tight matrix of SOFC tubes into a housing for maintaining the SOFC tube matrix compressed in a tight fitting matrix array; and inserting each of the jet air tubes into a respective one of the SOFC tubes in forming the SOFC module.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a partially cutaway perspective view of a prior art SOFC module containing a plurality of fuel cell tubes as shown in FIG. 1 with which the present invention is intened for use with;

DETAILED DESCRIPTION OF THE PREFERRED EMBODIMENT

Figure 1:
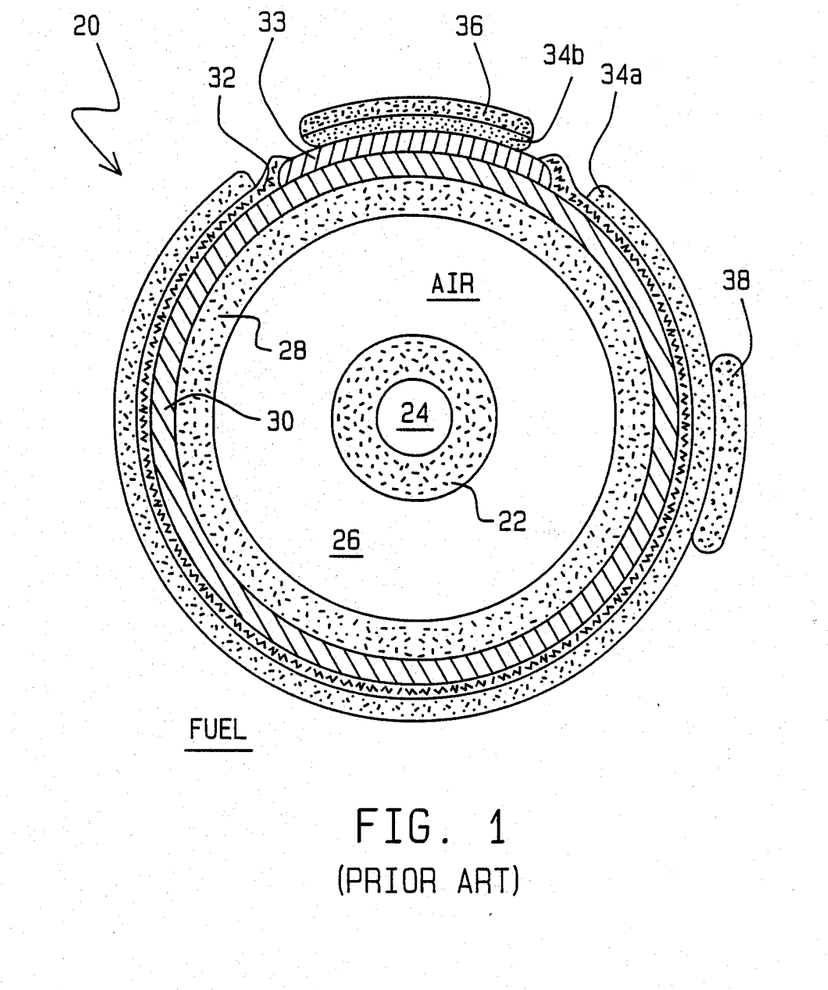
FIG. 1 is a cross sectional view of a prior art solid oxide fuel cell tube with which the SOFC assembly method and apparatus of the present invention are particularly adapted for use.
Figure 2:
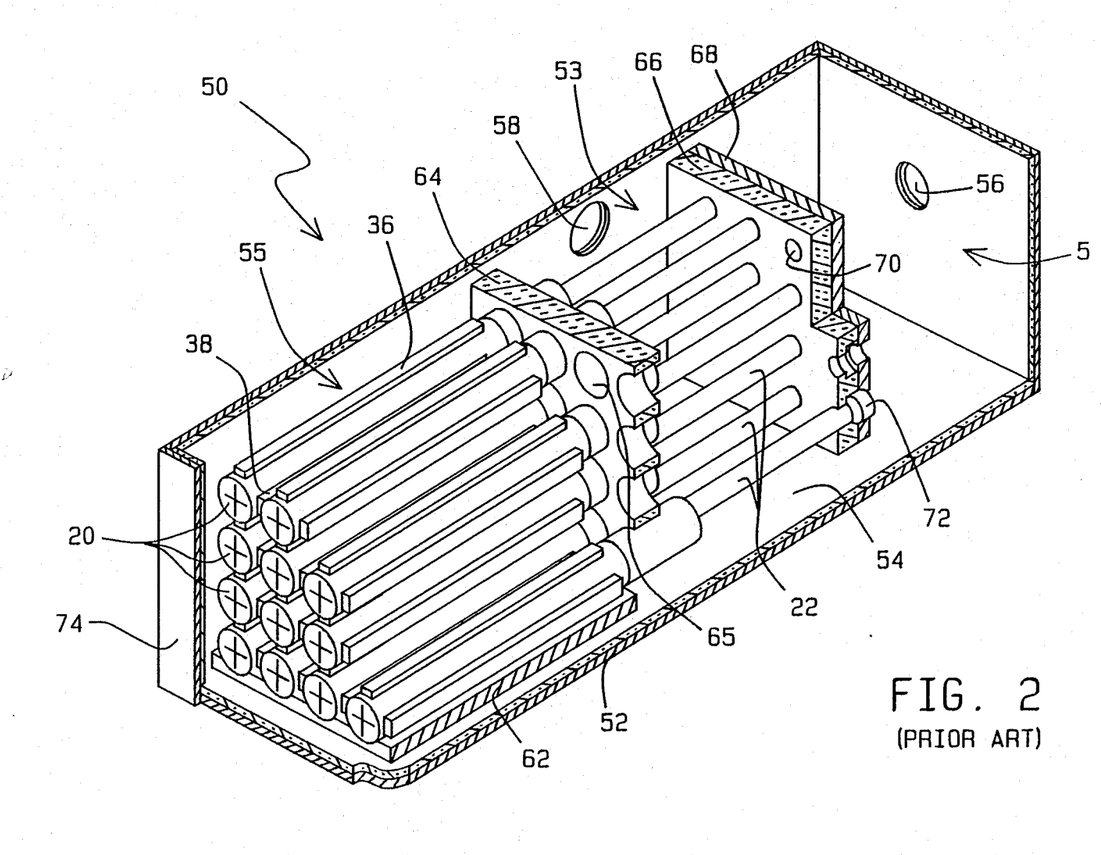

Referring to FIGS. 1 and 2, there are respectively shown a cross sectional view of a tube 20 used in a prior art SOFC and a partially cutaway perspective view of a bundle of such SOFC tubes connected in series and parallel to form a module 50. The present invention is involved in the assembly and coupling of the prior art SOFC tube and module shown in these figures and briefly described in the following paragraphs.

The SOFC tube 20 includes an inner air jet tube 22 defining an air inlet 24 into which air or another oxygen bearing gas is introduced. Disposed about the air jet tube 22 in a spaced, concentric manner is a support tube 28. Between the air jet tube 22 and the support tube 28 is an annular air outlet 26. The support tube 28 is preferably comprised of calcia stabilized zirconia which is porous and is provided with three outer layers deposited thereon. The first outer layer deposited upon the support tube 28 is that of an air electrode 30 which extends around the entire circumference of the support tube 28. The air electrode 30 is preferably comprised of a strontium doped lanthanum manganite-zirconia mixture. The next outer layer is an electrolyte 32 disposed upon the air electrode 30 and extending substantially around the entire circumference thereof. The final layer is that of a fuel electrode which includes two separate sections designated by numerals 34a and 34b. A first section of the fuel electrode 34a is disposed upon the electrolyte 32 and extends around a substantial portion of the circumference thereof, while a second fuel electrode section 34b is disposed upon an interconnector 33 positioned upon that portion of the air electrode 30 upon which is not disposed the electrolyte. A series interconnector pad 36 is positioned on the second fuel electrode section 34b, while a parallel interconnector pad 38 is positioned upon a portion of the first fuel electrode section 34a. The series and parallel interconnector pads 36, 38 are positioned approximately 90° from one another about the outer periphery of the SOFC tube 20 and are preferably comprised of nickel felt. The interconnector 33 is a strip preferably comprised of magnesium doped lanthanum chromite which connects with the air electrode 30 and brings the cathode current to the surface where series connections can be made between SOFC tubes. The electrolyte 32 is a thin impervious coating of yttria stabilized zirconia through which oxygen ions generated at the cathode diffuse and subsequently interact with hydrogen gas at the anode interface to form water as a by-product. The electrolyte layer 32 together with the interconnector 33 forms a sealed envelope to prevent molecular oxygen from diffusing through the layers to chemically react with the molecular hydrogen, thereby avoiding a chemical short and lowering cell efficiency.

The air jet tube 22, which is typically comprised of 98% alumina, is an open ended, thin walled tube which directs the combustion air, or another oxidant, to a closed end of the porous support tube 28. The porous support tube 28 serves as an oxidant gas envelope while supporting the thin layers of electrodes, electrolyte and intereconnects. During operation, air flows through the center of the SOFC tube 20 and fuel passes over its exterior. Oxygen from the air diffuses through the porous support tube 28 and the air electrode 30 (cathode), while fuel diffuses through the fuel electrode ( anode). These process media electrochemically react through the electrolyte 32, generating products such as water vapor, carbon dioxide, heat and electrical energy. The high temperature water vapor and carbon dioxide are carried away from the cell with, for example, unburned fuel, and electrical power is transferred in series from the inner air electrode 30 of one cell to the outer fuel electrode of the next cell.

FIG. 2 is a partially cutaway perspective view of a plurality of such SOFC tubes 20 each forming elongated, cylindrical fuel cells arranged in a bundle to form an SOFC module 50. The SOFC module 50 includes an air inlet preheat chamber 51, a lean fuel after burning chamber 53, and a fuel cell housing chamber 55. The SOFC module 50 includes a generally rectangular, closed outer housing 52 preferably comprised of stainless steel. Disposed on the inner surface of the outer housing 52 is an inner insulation 54 preferably comprised of $Al_2O_3$ or mullite. Positioned within the outer housing 52 and inner insulation 54 and separating the air inlet preheat chamber 51 and the lean fuel after burning chamber 53 is a generally planar sheet comprised of a layer of $Al_2O_3$ felt perforated pad 66 and a stainless steel perforated plate 68. Positioned within the outer housing 52 and between the SOFC module's lean fuel after burning chamber 53 and inner fuel cell housing chamber 55 is a porous wall 64 having a plurality of spaced apertures 65 therein. An oxidant gas such as air is introduced into the inlet preheat chamber 51 via an inlet aperture 56 in one end of the SOFC module's outer housing 52. The temperature of the oxidant gas is increased in the preheat chamber 51, with the heated air then flowing through a plurality of air jet tubes 22 within the after burning chamber 53. A first end of each of the air jet tubes 22 is inserted in a respective aperture 70 within the alumina felt perforated pad 66 and stainless steel perforated plate 68. An alumina expansion ring 72 is dispc.sed over the first end of each of the air jet tubes 22 and provides a tight seal between each of the tubes and the felt and stainless steel perforated plate combination. Each of the air jet tubes 22 is continuous with and coupled to a respective SOFC tube 20 within the fuel cell housing chamber 55. Each of the SOFC tubes 20 extends through a respective aperture 65 within the porous wall 64. Each of the SOFC tubes 20, except for those positioned outermost, or around the periphery of the module, has a respective pair of series interconnector pads 36 and parallel interconnector pads 38 coupled thereto. The oxidant gas which flows through the air jet tubes 22 continues to flow to the end of a calcia-stabilized zirconia SOFC tube 20, allowing the oxidant gas to pass through a porous support tube in each of the SOFC cells as previously described. The partitions within the SOFC module 50 serve as porous-insulator barriers and support for the alumina air jet and generator tubes.

The fuel, on the other hand, is directed into the SOFC module 50 via an aperture (not shown) in the opposite end from that of the oxidant inlet aperture 56. The fuel ($CO/H_2$) thus flows through the base 74 of the SOFC module 50 and over the outer fuel electrode of each of the SOFC tubes 20 to react with the oxygen ions at the electrolyte interface. Lean fuel diffuses through the porous wall (preferably comprised of barrier board), and then burns with the excess air which leaves the inside of each of the porous tubes to exit as hot gas for co-generation. Burned gas flows out of the SOFC module 50 via a pair of burnt gas outlets 58 in the after burning chamber 53. Electrical current generated by the matrix of SOFC tubes 20 when connected in series and in parallel by the aforementioned interconnector pads is removed from the SOFC module 50 by two conductor metal plates or pads 62 which span the bottom of the housing 52, as shown in FIG. 2, and make contact with the fuel electrodes (anode) and span the top facing wall of the module housing and make contact with the air electrodes (cathode) of the SOFC tubes through the interconnector described above with respect to FIG. 1. It should be noted that the upper conductor metal plate is not shown in FIG. 2 for simplicity.

Figure 3:
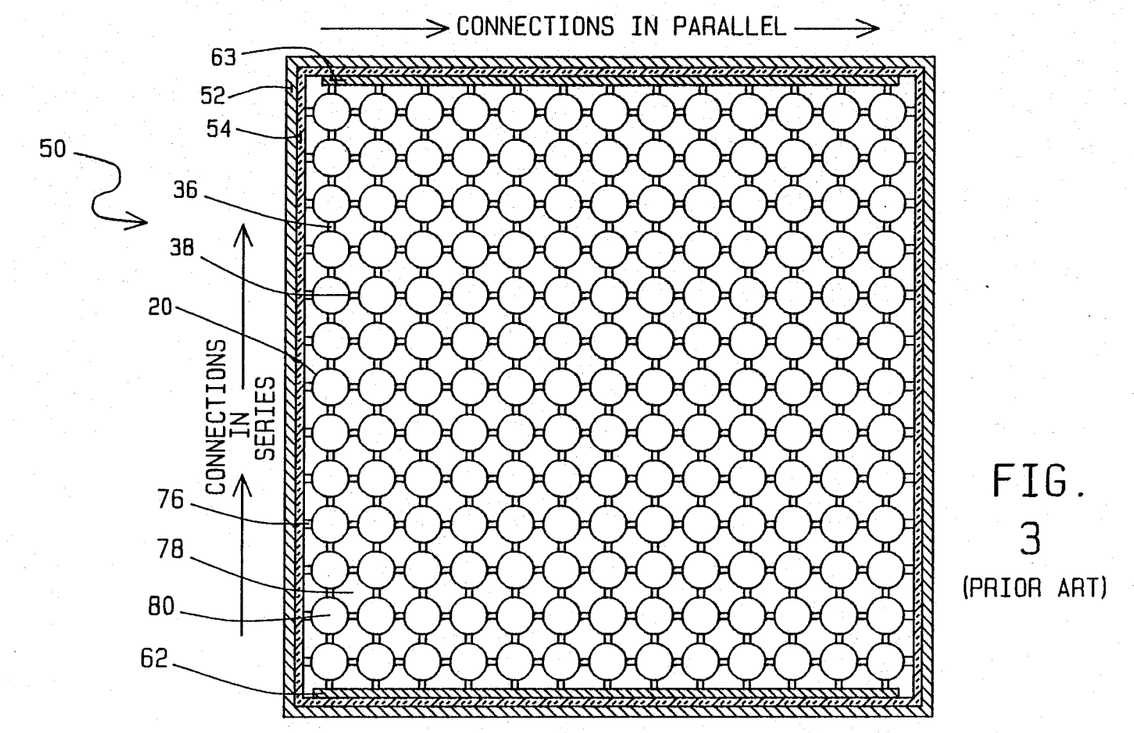
FIG. 3 is a cross sectional view of the SOFC module shown in FIG. 2 which includes a 14×14 matrix of SOFC tubes.

Referring to FIG. 3, there is shown a cross sectional view of the SOFC module matrix 50 of FIG. 2. Each of the SOFC tubes 20 is coupled to either four adjacent SOFC tubes or to the lower conductor plate/pad (anode) 62 or to the upper conductor plate/pad (cathode) 63. An alumina felt pad 76 is positioned between and in contact with the inner insulation layer 54 of the module's housing and with each of the SOFC tubes 20 positioned along the facing, lateral surfaces of the SOFC module 50. As shown in the figure, each of the series interconnector pads 36 are arranged in a generally vertical array, while the parallel interconnector pads 38 are aligned generally horizontally across the SOFC module 50. The connections in parallel run generally across the width of the SOFC module 50, while the connections in series run generally vertically in the SOFC module as shown by the arrows in FIG. 3. The space within each of the SOFC tubes 20 defines an air channel 80, while the space between adjacent SOFC tubes defines a fuel channel 78. The alumina felt pads 76 are electrically insulated from the outer housing 52 by the sprayed layers of insulation 54 within all of the inside walls of the SOFC module 50. The upper cathode plate/pad 63 connects all of the SOFC tube cathode interconnectors in parallel, while the lower anode conductor plate/pad 62 connects all of the SOFC tube anode interconnectors in parallel. The cathode and anode felt pads are welded to the interconnector bus bars and then to the manifold in providing a path for the current generated by each of the SOFC tubes 20.

Figure 4:
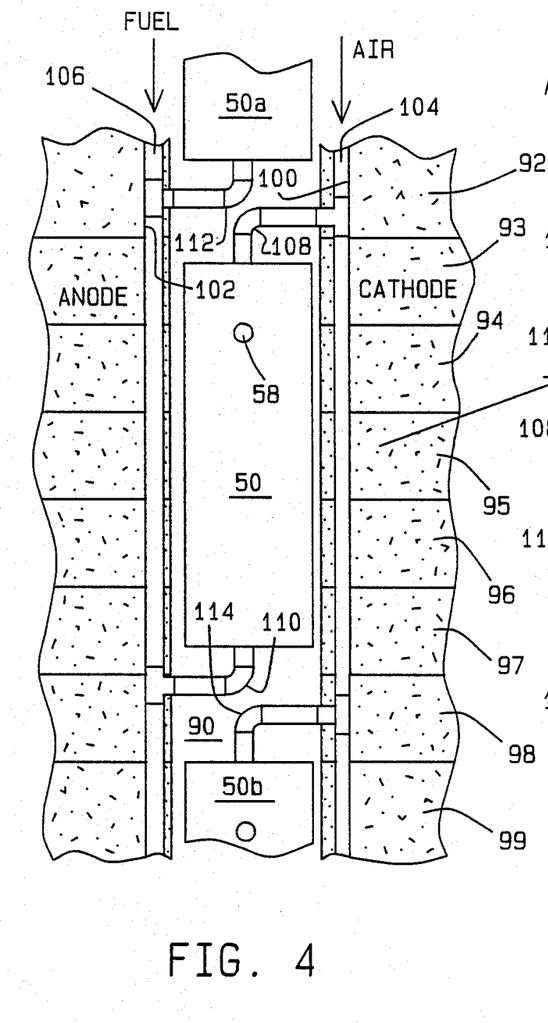
FIG. 4 is a sectional view of an SOFC installation with which the present invention is intended for use.
Figure 5:
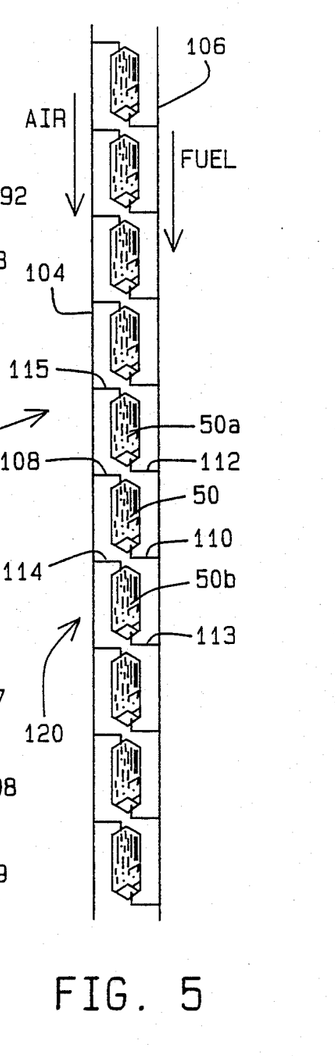
FIG. 5 is a sectional view in simplified schematic diagram form of a string of SOFC modules as illustrated in FIG. 4.
Figures 6, 8:
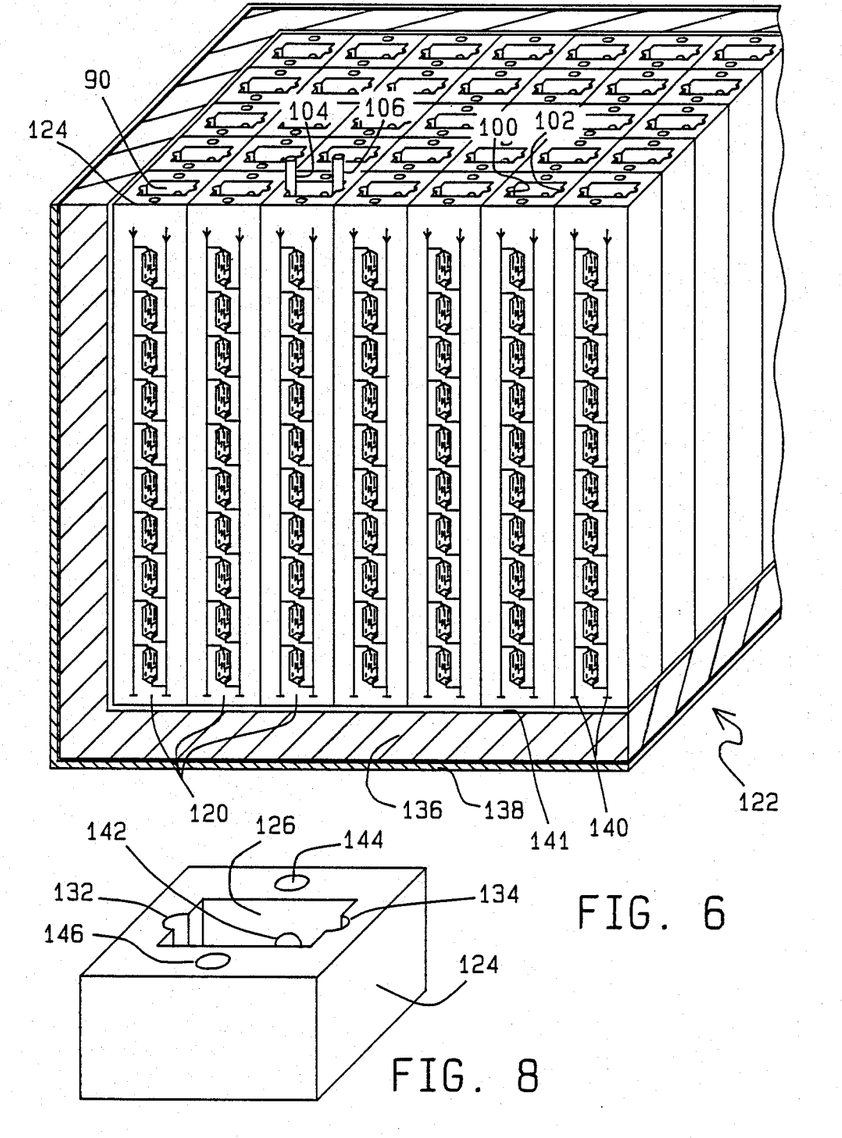
FIG. 6 shows a 3-dimensional matrix of the SOFC modules illustrated in FIGS. 4 and 5.
FIG. 8 is a perspective view of a ceramic block used in forming an SOFC matrix and module.

Referring to FIGS. 4–11, there are shown various details of an SOFC installation with which the present invention is intended for use. FIG. 4 is a sectional view of that SOFC installation. The SOFC module 50 is positioned lengthwise within and along the length of a square shaft 90 defined by the apertures within a plurality of ceramic blocks 92 through 99 arranged in a stacked configuration. A stacked array of such SOFC modules is shown in simplified schematic diagram form in FIG. 5, while a perspective view of a single block 124 is shown in FIG. 8. Each of the blocks 92 through 99 includes a generally square, center slot, or aperture, 126 as shown in block 124 illustrated in FIG. 8. With the blocks 92 through 99 arranged in a linear, stacked array as shown in FIG. 4, each of the center apertures of the blocks is in alignment so as to define a square shaft 90 extending the length of the stacked, aligned blocks. Positioned lengthwise within the shaft 90 are a plurality of SOFC modules 50, 50a and 50b.

Each of the blocks, as shown in FIG. 8 for the case of block 124, includes first and second notches 132, 134 in facing, inner portions of the block which define a portion of the aperture 126 therein. Each of the first and second notches 132, 134 has a generally semi-circular cross section and extends from the top to the bottom of the block in a linear manner. When the blocks 92 through 99 are arranged in a stacked array as shown in FIG. 4, their respective first and second notches are placed in alignment so as to provide the stacked array with first and second tube sleeves 100, 102 extending the entire length of the stacked array of blocks. The first and second tube sleeves 100, 102 form respective notches in facing portions of the square shaft 90 and extend the entire length of the shaft. The first tube sleeve 100 is adapted to receive an anode/fuel tube 106, while the second tube sleeve 102 is adapted to receive a cathode/air tube 104. The anode/fuel tube 106 is coupled to each of the SOFC modules 50, 50a and 50b within the square shaft 90 by means of a respective L-shaped fuel coupling/support member 110, 112 and 113. Each of the fuel coupling/support members 110, 112 and 113 is comprised of a rigid, high temperature resistant and electrically conductive alloy such as alumina. A gaseous fuel under pressure delivered to the anode/fuel tube 106 is directed into the fuel cell housing chamber in a lower portion of each of the SOFC modules 50, 50a and 50b.

In a similar manner, the cathode/air tube 104 disposed within the first tube sleeve 100 and extending along the length of the square shaft 90 is adapted to receive a cathode/air tube 104. The cathode/air tube 104 is coupled to each of the SOFC modules 50, 50a and 50b within the square shaft 90 by means of a respective air coupling/support member 108, 115 and 114. With an oxidant such as air delivered under pressure to the cathode/air tube 104, the air is provided to an air inlet preheat chamber within an upper portion of each of the SOFC modules 50, 50a and 50b. As in the case of the fuel coupling/support members, each of the air coupling/support members 108, 114 and 115 is comprised of a rigid, high temperature resistant and electrically conductive alloy such as alumina. The combination of the cathode/air tube 104 and air coupling/support members 108, 114 and 115 not only deliver an oxidant gas to each of the SOFC modules, but also provide support for each of the modules.

In addition, each of the air coupling/support members 108, 114 and 115 is coupled to the respective cathode elements within the SOFC modules 50, 50b and 50a such that the cathode/air tube 104 functions as a current conductor in the stacked array of SOFC modules. Similarly, the anode/fuel tube 106 is coupled by means of the fuel coupling/support members 110, 112 and 113 to the anodes of SOFC modules 50, 50a and 50b, respectively. Thus, the anode/fuel tube 106 also functions as a current conductor in the stacked SOFC module array. It should be noted in comparing FIGS. 4 and 5, that the string arrangement 120 of SOFC modules of FIG. 5 is viewed from the opposite direction than the view of the stacked array of SOFC modules shown in FIG. 4. Thus, the fuel coupling support members 110, 112 and 113 extend to the right in FIG. 5 rather than to the left as shown in FIG. 4, while the air coupling/support members 108, 114 and 115 extend to the left in FIG. 5, rather than to the right as illustrated in FIG. 4. FIG. 5 shows that a large number of SOFC modules may be arranged in a vertically stacked array, with the cathode/air and anode/fuel tubes 104, 106 in combination with the plurality of air and fuel coupling/support members providing support for each of the SOFC modules, directing fuel and oxidant gases into each of the modules in initiating and sustaining the electrochemical combustion of the fuel, and providing current conducting paths from each of the SOFC modules to permit the DC power generated by the electrochemical combustion to be removed from the SOFC string arrangement 120.

Referring to FIG. 6, there is shown a partially cutaway perspective view of a matrix 122 comprised of a plurality of stacked, string arrangements 120 of the SOFC modules previously described. A pair of cathode/air and anode/fuel tubes 104, 106 are illustrated, it being understood that each stacked array of blocks 124 is provided with a similar pair of tubes coupled to a plurality of SOFC modules positioned within the square, elongated shaft 90 defined by the stacked array of blocks. Each of the cathode/air tubes 104 is positioned within a respective first tube sleeve 100, while each of the anode/fuel tubes 106 is positioned within a facing, second tube sleeve 102. The matrix 122 of SOFC string arrangements 120 is positioned within an outer housing or shell 138 preferably comprised of steel. Positioned between the SOFC string arrangements 120 and the outer steel housing 138 is an insulating layer 136 preferably comprised of a brick-like material. The lower ends of each of the cathode/air and anode/fuel tubes 104, 106 are provided with support feet 140 which are positioned upon a generally flat, rigid floor or bottom panel 141 within the SOFC matrix 122. The string support feet 140 provide for the stable positioning of the fuel and oxidant tubes as well as the SOFC modules coupled thereto within the SOFC matrix 122. The string arrangement 120 of SOFC modules may be comprised of a plurality of stacked ceramic blocks as peeviously described, or may include a single, elongated, hollow ceramic support structure as illustrated in FIG. 6.

Figure 7:
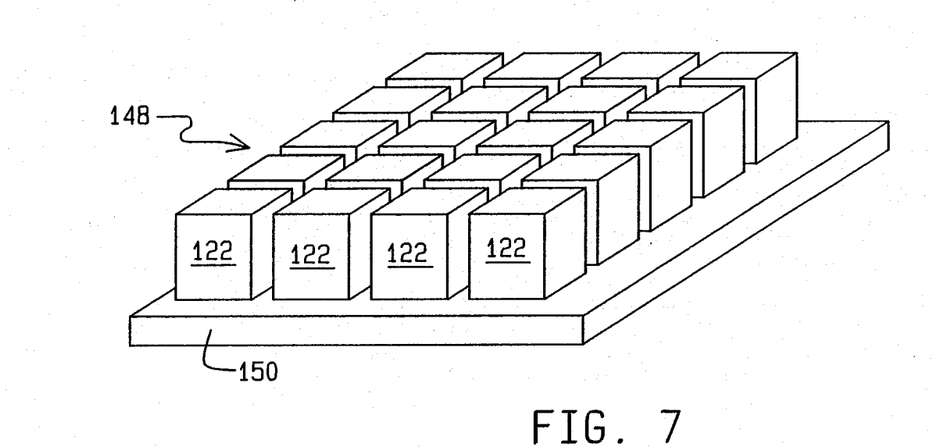
FIG. 7 illustrates a plurality of SOFC matrices such as shown in FIG. 6 arranged to form an SOFC plant.

A plurality of SOFC matrices 122 may be positioned upon and mounted to a support structure 150 as shown in FIG. 7 to form an SOFC plant 148. With regard to energy production, individual solid oxide fuel cell tubes capable of producing 20 W of power are contemplated for use in the present invention, with these individual SOFC tubes combined in a 14×14 array to form an SOFC module capable of producing 10 KW. The modules of 14×14 SOFC tubes are contemplated for arrangement in 10 MW matrices which, in turn, can be combined to form a 200 MW SOFC plant.

As described above, each of the SOFC modules 50 includes a pair of burnt gas outlets 58 in facing, lateral walls of the module. The burnt gas outlets 58 allow exhaust gases to escape from the SOFC module and flow into the shaft 90 defined by the aligned apertures in the stacked array of blocks 92 through 99. As shown in FIG. 8, the facing inner surfaces of the block 124 include first and second exhaust gas outlets 142. Each of the exhaust gas outlets 142 is coupled to and continuous with a respective one of first and second exhaust gas manifolds 144, 146 within a lateral wall of the block 124. With a plurality of blocks arranged in a stacked array, the first and second gas manifolds 144, 146 of each block are arranged in common alignment so as to form a pair of exhaust gas manifolds within facing walls of the blocks and extending the length of a string arrangement of SOFC modules. Flow of the exhaust gases produced as a result of the electrochemical combustion within each of the SOFC modules from the elongated, linear shaft 90 through the paired exhaust gas outlets 142 and into the first and second exhaust gas manifolds 144, 146 allows these exhaust gases to be removed from the SOFC modules.

Figure 9:
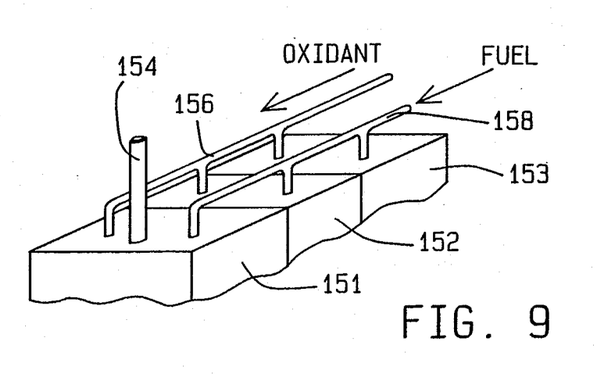
FIG. 9 is a perspective view of the top of an SOFC matrix illustrating the air, fuel and burnt exhaust gas connections thereto.

Referring to FIG. 9, there is shown a perspective view of the top of three stacked arrays of SOFC modules which respectively include top blocks 151, 152 and 153, each comprised of refractory brick. Each of the blocks 151, 152 and 153 includes a pair of apertures, with one of the apertures coupled to an oxidant gas line 156 and the other aperture coupled to a fuel gas line 158. In this manner, an oxidant gas as well as a fuel gas can be delivered to a plurality of SOFC modules arranged in a stacked array and enclosed within and surrounded by a self-supporting brick or ceramic structure. Also coupled to an aperture within the top surface of each of the top blocks 151, 152 and 153 is a hot gas exhaust tube 154, although for simplicity a hot gas exhaust tube is only shown coupled to and mounted on block 151. The hot gas exhaust tube 154 is coupled to each of the exhaust gas manifolds within the stacked array of SOFC modules of which block 151 is the topmost brick. It is in this manner that the hot exhaust gases are vented from each stacked array of SOFC modules. The hot exhaust gases may be provided to a co-generator plant for conversion to a more readily usable form of energy.

Figure 10:
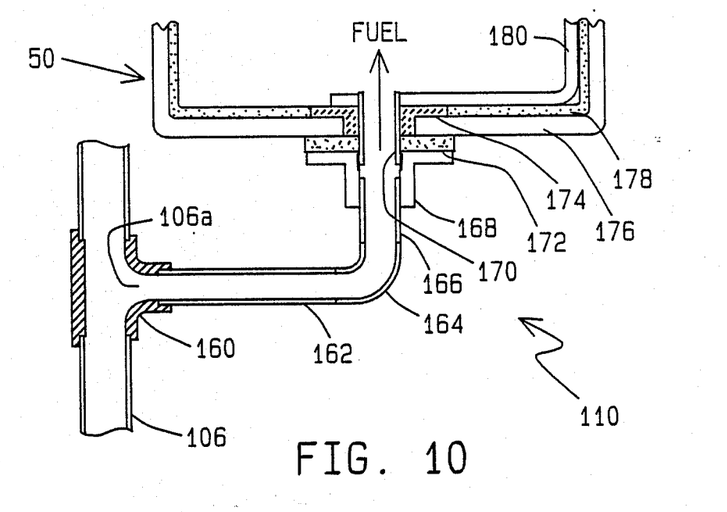
FIG. 10 is a sectional view illustrating the details of the manner in which fuel is provided to an SOFC module.

Referring to FIG. 10, there is shown the details of the manner in which an SOFC module 50 is coupled to and supported by an anode/fuel tube 106. With the anode/fuel tube 106 positioned within one of the facing notches on a lateral, inner surface of a SOFC module block, a straight tube 162 is coupled to an aperture 106a in the anode/fuel tube by means of a T-connector 160. An L-bend 164 is attached to the distal end of the straight tube 162 and is oriented generally vertical in an upward direction. A manifold connector 166 is then attached to the distal end of the L-bend 164 and a support flange 168 is positioned about the open, distal end of the manifold connector. The SOFC module 50 includes the previously described outer housing 176 which is lined with an insulation layer 178. The lower wall of the SOFC module's housing 176 includes an aperture therein through which extends and in which is positioned an insulating collet 174. Positioned within the insulating collet 174 in a tight fitting manner is a cylindrical flange connector 170 having a threaded distal, or lower, end portion. The upper, or proximal, end of the flange connector 170 is coupled to and in contact with an anode connector bar 180 which lines a portion of an inner surface of the SOFC module 50. The anode connector bar 180 is coupled to the anode electrodes within the SOFC module 50. The aforementioned support flange 168, which includes a threaded inner portion, is securely attached to the threaded end portion of the flange connector 170, with an insulating spacer 172 positioned in tight fitting relation between the support flange and the lower wall of the SOFC module's housing 176. The insulating collet 174 is preferably comprised of a ceramic material and insulates the SOFC module's housing 176 from the current carrying anode fuel coupling/support member 110.

Figure 11:
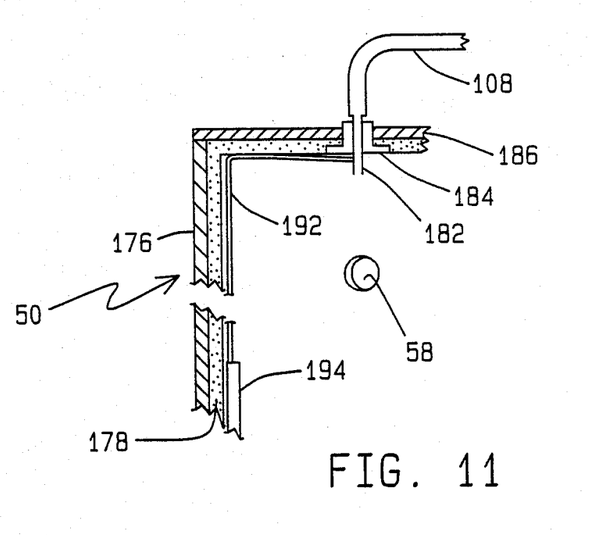
FIG. 11 is a partial sectional view illustrating the manner in which an oxidant gas is delivered to an SOFC module.

Referring to FIG. 11, there is shown a sectional view illustrating the details of the manner in which the cathode air coupling/support member 108 is coupled to an SOFC module 50 for providing an oxidant gas to the module. The structural details of the cathode air coupling/support member 108 are similar to those of the anode fuel coupling/support member 110 illustrated in FIG. 10. The cathode air coupling/support member 108 is therefore coupled to a flange connector 182 inserted through a support flange 184 which is securely positioned in an aperture in the upper wall of the SOFC module's housing 176. The support flange 184 provides electrical insulation between the inside of the SOFC module and the cathode air coupling/support member 108 and the module's housing 176. The proximal end of the conductive flange connector 182 is coupled to a cathode nickel felt plate 194 by means of a cathode connector bar 192. The cathode nickel felt plate 194 is positioned adjacent to an inner, lateral wall of the SOFC module 50 and is coupled to the cathode electrodes within the module. A similar anode nickel felt plate is provided for on the inner, right hand wall of the SOFC module 50 illustrated in FIG. 10, although it is not shown for simplicity and is further coupled to the anode connector bar 180. The structural and connection details of the air coupling/support member 108, which is coupled to the flange connector 182, are the same as those of the fuel coupling support member 110, but are not shown in FIG. 11 for simplicity. Facing lateral walls of the SOFC module 50 are provided with respective burnt gas outlets 58 as previously described and as illustrated in FIG. 11.

Figure 12:
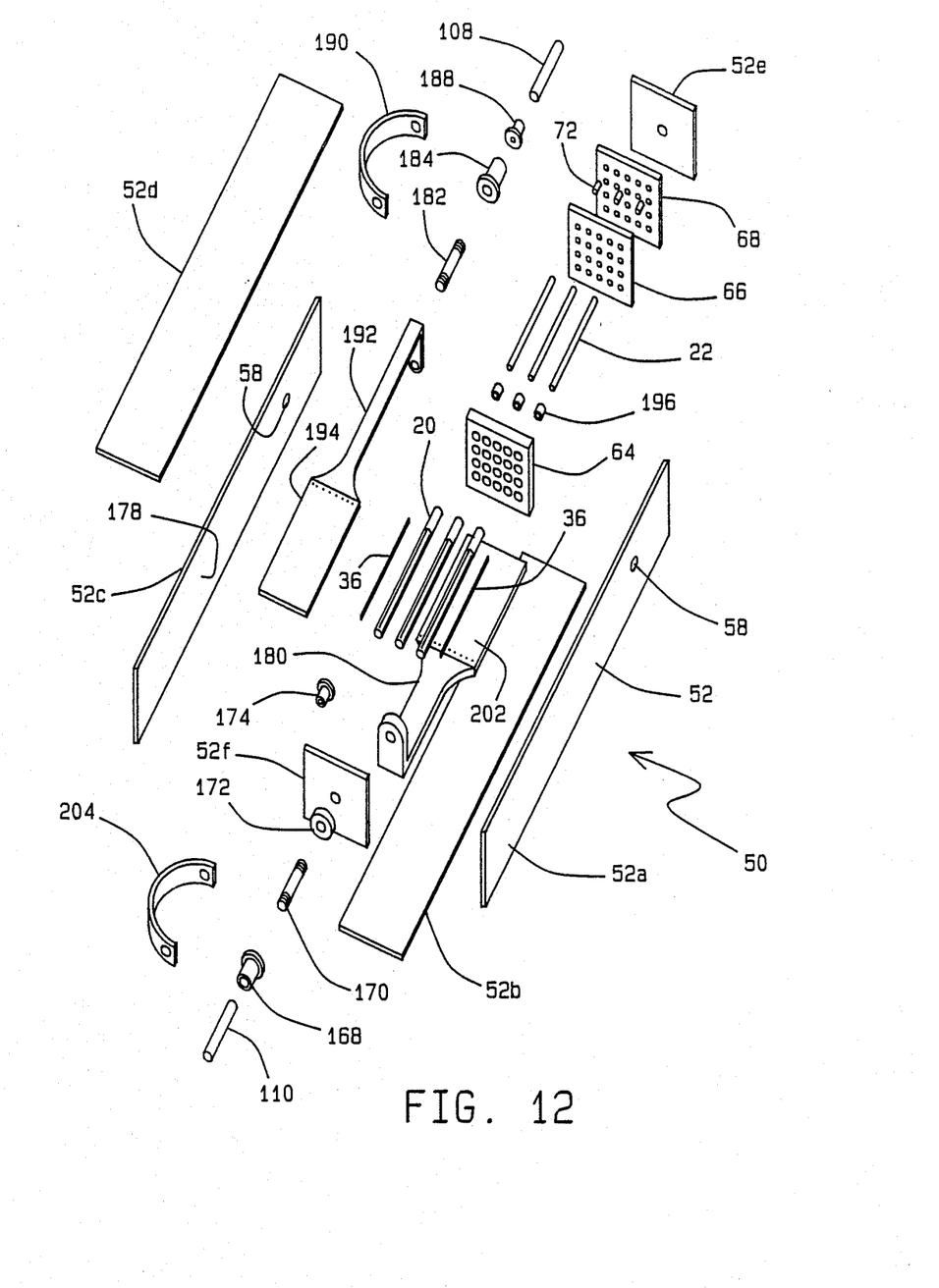
FIG. 12 is an exploded view of an SOFC module having an electrical and mechanical coupling arrangement in accordance with the principles of the present invention.

Referring to FIG. 12, there are shown additional details as well as the manner of coupling the SOFC module 50 illustrated in FIG. 2. Common identifying numbers have been used for the same elements in FIGS. 2 and 12. As shown in FIG. 12, the SOFC housing 52 is comprised of a plurality of lateral panels 52a, 52b, 52c and 52d. A top panel 52e and a bottom panel 52f are coupled to the aforementioned side panels and define the upper and lower end portions of the closed housing 52. Each of the top and bottom panels 52e, 52f has a respective aperture therein. Disposed within the housing 52 in a spaced manner is the combination of an aluminum oxide felt perforated pad 66 and stainless steel perforated plate 68 and a porous wall 64. A plurality of alumina expansion rings 72 are positioned in respective apertures within the perforated plate 68 and are attached to the ends of each of a plurality of air jet tubes 22. Each of the air jet tubes 22 extends through a respective aperture within the perforated pad 66 at one end thereof and extends through another respective aperture within the porous wall 64. An alumina support felt ring 196 disposed in each aperture of the porous wall 64 provides sealed engagement between each air jet tube 22 and a respective SOFC tube 20 also inserted through the porous wall. Each of the SOFC tubes 20 is adapted to receive a respective air jet tube 22 inserted therein. A plurality of interconnector pads 36 surround each of the SOFC tubes 20 and electrically connect adjacent SOFC tubes either in parallel or in series.

An anode felt pad 202 is coupled to one end of an anode connector bar 180, while the other end of the anode connector bar is provided with an aperture and is adapted for receiving and electrical coupling to a conductive flange connector 170 inserted through an aperture in the lower panel 52f of the module's housing 52. Similarly, one end of a cathode connector bar 192 is provided with a cathode nickel felt plate 194, while the other end of the cathode connector bar is provided with an aperture for receiving and electrical coupling to a flange connector 182 inserted through an aperture in the top panel 52e of the module's housing 52.

The inner surface of the housing 52 is provided with a layer of alumina insulation 178. Insulating collets 174 and 184 are respectively disposed about the proximal ends of flange connectors 170 and 182 in order to electrically isolate the module's housing 52 from the anode and cathode connector bars 180, 192 and conductors coupled thereto. Anode and cathode support collars 168 and 188 are used to respectively couple anode flange connector 170 to the anode manifold connector 110 and cathode flange connector 182 to the cathode manifold connector 108.

In accordance with the present invention, an anode carrier expansion, connector bar 204 is disposed at the lower end of the module housing 50, while a cathode carrier expansion, connector bar 190 is positioned adjacent to the top of the housing. Each of the anode and cathode carrier expansion, connector bars 204, 190 is in the form of a curved member, having apertures at each end thereof, and is comprised of a resilient, metallic material capable of electrical conduction. The anode carrier expansion, connector bar 204 is coupled at its upper end to the anode connector bar 180 by means of the anode flange connector 170 which is inserted through the upper aperture in the anode carrier expansion, connector bar. The lower end of the anode carrier expansion, connector bar 204 is connected to and in contact with the anode manifold connector 110 which is inserted through the lower aperture in the anode carrier expansion, connector bar. Similarly, the cathode flange connector 182 is inserted through the lower aperture in the cathode carrier expansion, connector bar 190 and electrically couples the cathode carrier expansion, connector bar to the cathode connector bar 192. The cathode manifold connector 108 is inserted through the upper aperture of the cathode carrier expansion, connector bar 190 and is electrically coupled thereto. The anode and cathode carrier expansion, connector bars 204, 190 are thus electrically coupled to the fuel and air coupling/support members previously described with respect to FIGS. 4 and 5 by the anode and cathode manifold connectors 110 and 108, respectively. The curved metallic anode and cathode carrier expansion, connector bars 204 and 190 thus connect the anode and cathode ends of the SOFC module 50 to the fuel and air coupling/support members 110 and 108, respectively, and provide a slip joint arrangement that allows for the expansion of the SOFC module caused by the elevated operating temperatures of the SOFC. By maintaining electrical coupling between the SOFC module 50 and the conductive fuel and air coupling/support members 110 and 108 and allowing for relative displacement between the upper and lower ends of the SOFC module and the aforementioned coupling/support members, the build-up of excessive stress in the SOFC module and supporting structure is avoided and the operating lifetime of the SOFC is extended. The anode and cathode carrier expansion, connector bars 204, 190 thus reduce one possibility of premature failure of the SOFC due to the extreme environment in which it operates.

Figures 13A, 13B, 14:
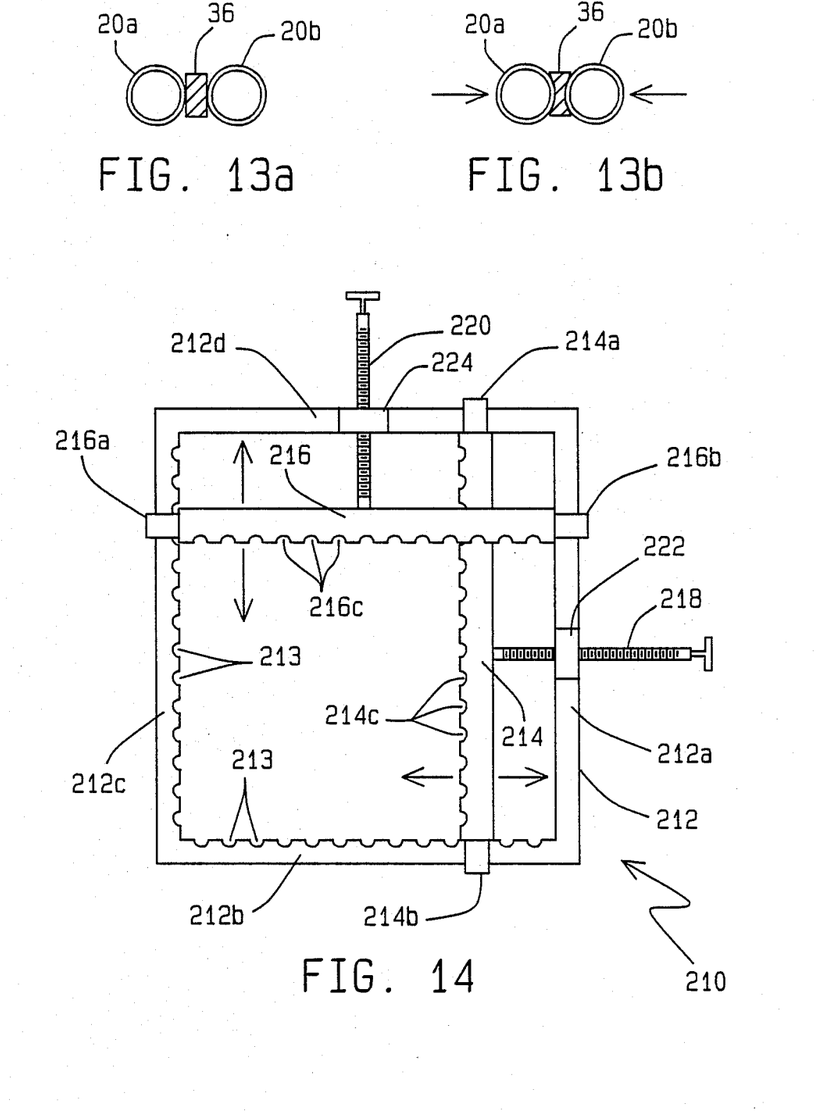
FIGS. 13a and 13b illustrate the arrangement of adjacent SOFC tubes and a compressible conductive pad disposed therebetween.
FIG. 14 is a simplified schematic diagram of apparatus for forming a plurality of SOFC tubes and conductive pads disposed therebetween in a tightfitting matrix array.

Referring to FIGS. 13a and 13b, the details of the manner in which adjacent SOFC tubes are electrically and mechanically coupled in an SOFC module are illustrated in simplified schematic diagram form. In FIG. 13a, an interconnector pad 36 is shown positioned between first and second SOFC tubes 20a and 20b. As shown in FIG. 13b, a compressive force has been applied in the direction of either or both of the arrows shown therein so as to displace the first and second SOFC tubes 20a, 20b toward one another. Application of a force to the SOFC tubes 20a, 20b in the direction of the arrows shown in FIG. 13b results in a compression of the interconnector pad 36 which is used to form either a series or parallel electrical coupling between adjacent SOFC tubes. As previously described, the interconnector pad 36 is preferably in the form of a long strip and is comprised of a compressible, conductive felt material of either nickel or nickel/alumina composition. Upon compression, the interconector pad 36 assumes an hourglass shape, it being understood that each of the SOFC tubes is surrounded by four such spaced interconnector pads around its periphery.

Referring to FIG. 14, there is shown a simplified schematic diagram of one embodiment of a compression apparatus 210 for forming a plurality of SOFC tubes with interconnector pads disposed therebetween in a tightfitting matrix array. The compression apparatus 210 is generally rectangular, or square, in shape and is comprised of a frame 212 having four sides 212a through 212d. Each of the frame sides 212a through 212d is of a rigid material, with the coupled frame sides forming a closed structure. The inner surface of each of the side frames 212b and 212c is provided with a plurality of spaced, generally semicircular recesses 213 along the length thereof.

The compression apparatus 210 further includes first and second elongated movable members 214 and 216. The first movable member 214 includes a pair of slide brackets 214a and 214b on respective ends thereof. Slide bracket 214a is coupled in a sliding manner to frame side 212d, while slide bracket 214b is slidably coupled to frame side 212b. The slide brackets 214a, 214b permit the first movable member 214 to be moved along the lengths of the aforementioned frame sides as shown by the arrows in FIG. 14.

The frame side 212a is provided with a threaded mounting bracket 222 at an intermediate portion thereof. The threaded mounting bracket 212 includes a threaded aperture through which a threaded adjusting bar 218 is inserted. The inner end of the threaded adjusting bar 218 is coupled to the first movable member 214. By rotating the threaded adjusting bar 218 in either a first or second direction, the first movable member 214 may be moved to either the right or to the left as shown in FIG. 14. It should be noted that the inner surface of the first movable member 214 is also provided with a plurality of spaced, generally semicircular recesses 214c along the length thereof.

As in the case of the first movable member 214, the second movable member 216 includes a pair of slide brackets 216a and 216b on respective ends thereof. Slide bracket 216a is slidably coupled to frame side 212c, while the slide bracket 216b is slidably mounted to frame side 212a. The second movable member 216 is thus free to move in the directions of the arrows in FIG. 14 along frame sides 212a and 212c. Frame side 212d is also provided with a threaded mounting bracket 224 along an intermediate portion thereof. The threaded mounting bracket 224 also includes a threaded aperture therein through which an adjusting bar 220 is inserted. The proximal end of the adjusting bar 220 is securely attached to the second movable member 216 such that upon rotation of the threaded adjusting bar the second movable member is displaced either upward or downward as shown in FIG. 14. The first and second movable members 214, 216 may either be displaced from one another or in contact with one another where they overlap provided that they can be slidably displaced relative to one another. The inner edge of the second movable member 216 is also provided with a plurality of spaced, generally semicircular recesses 216c along the length thereof.

Each of the recesses within the frame sides 212b and 212c as well as each of the recesses within the first and second movable members 214, 216 is adapted to receive and engage a respective SOFC tube. With a matrix of SOFC tubes disposed within the space defined by the frame sides 212b and 212c and the first and second movable members 214, 216, displacement of the first movable member 214 in a leftward direction and displacement of the second movable member 216 downward will result in compression of the SOFC tube matrix which includes a pluality of interconnector pads as previously described. In this manner, the interconnector pads are squeezed so as to conform to the outer surface of the round SOFC tubes for improved electrical contact. A tight matrix of virtually any number of SOFC tubes may be formed in this manner without either flattening or altering the shape of the interconnector pads prior to their conformation in an hourglass shape or crushing or crumbling any of the SOFC tubes within the matrix.

Figure 15A:
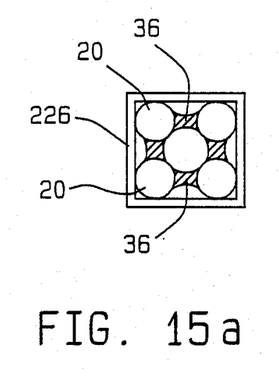
FIGS. 15a, 15b and 15c illustrate apparatus for maintaining various sized matrix arrays of SOFC tubes in a tightfitting arrangement in progressively assembling larger arrays of SOFC matrices.
Figure 15B:
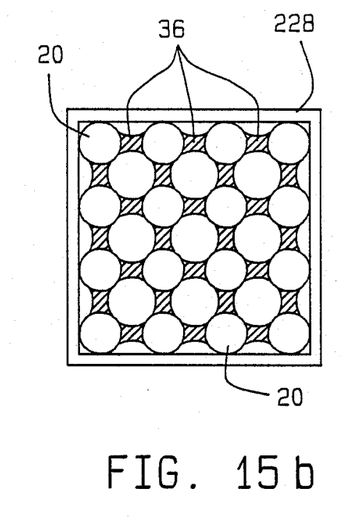
Figure 15C:
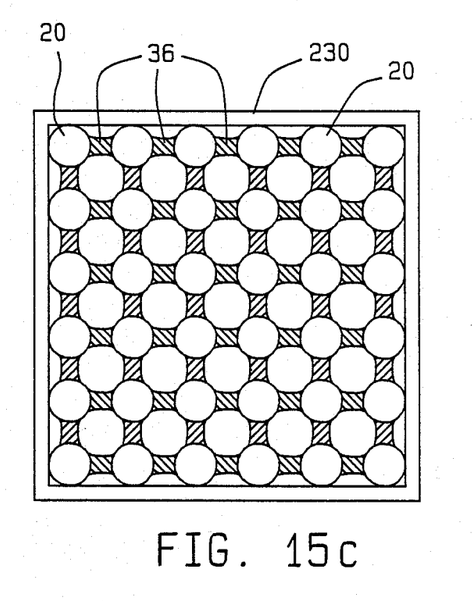

The procedure in forming a large matrix of SOFC tubes involves constructing the matrix from the inside out. Thus, the first step is to form a 2×2 matrix as shown in FIG. 15a. This 2×2 matrix is positioned within the compression apparatus 210 so as to form a tight matrix by compressing the conductive interconnector pads. With the interconnector pads 36 sufficiently compressed, a first rigid square retainer 226 is positioned in tightfitting relation about the four SOFC tubes 20. The 2×2 matrix is then released from the compression apparatus 210 and an outer layer of SOFC tubes is then positioned about the 2×2 matrix, with the larger 4×4 matrix then positioned within the compression apparatus 210 in order to compress the interconnector pads 36 without damaging the 16 SOFC tubes in the second matrix illustrated in FIG. 15b. The first rigid square retainer 226 is removed. After sufficient compression of the 4×4 matrix, a second, larger square retainer 228 is positioned in tightfighting relation about this matrix in order to maintain the matrix as tight as possible after the compression apparatus 210 has been removed from the matrix. Another outer layer is then positioned about the 4×4 matrix so as to form a 6×6 matrix as shown in FIG. 15c. Rigid square retainer 228 is removed. The 6×6 matrix is then compressed in the manner previously described, with a third square retainer 230 positioned about the tightened 6×6 matrix in order to allow yet another outer layer of SOFC tubes to be positioned about the 6×6 matrix in forming an even larger SOFC matrix. In a preferred embodiment, a 14×14 matrix of SOFC tubes is used in forming an SOFC module. It should be noted here that each of the first, second and third square retainers 226, 228 and 230 as well as the compression apparatus 210 are of limited thickness and possess the strength required for retention of the compressed SOFC matrix. By minimizing the thickness of the square retainers and compression apparatus these elements extend only over a limited portion of the length of the SOFC tubes permitting a given square retainer and the compression apparatus to simultaneously engage a matrix of SOFC tubes. The size of the compression apparatus 210 is also sufficiently large to permit it to be withdrawn from a compressed SOFC matrix by drawing a square retainer through the inner aperture defined by the frame sides 212b and 212c and the first and second movable members 214 and 216.

Figure 16:
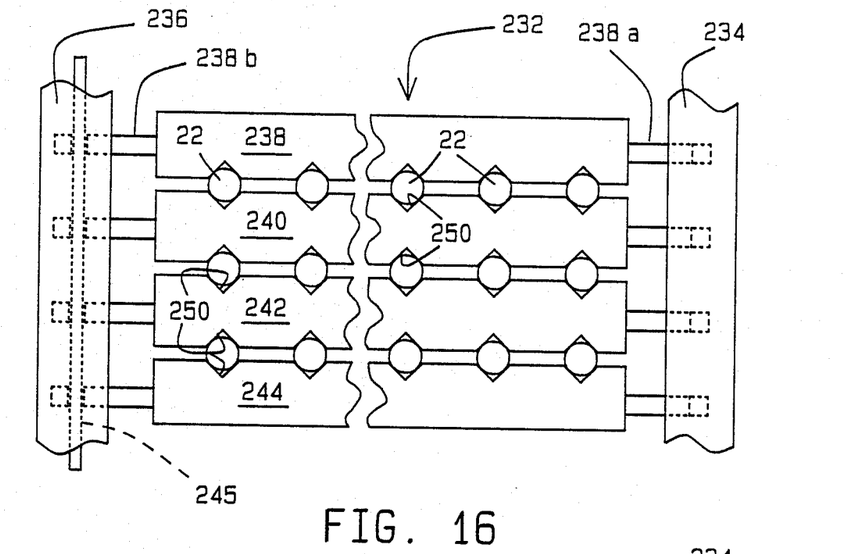
FIG. 16 is a simplified end-on planar view of apparatus for maintaining a plurality of jet air tubes in a matrix array for insertion within respective SOFC tubes in forming an SOFC module in accordance with the present invention.
Figure 17:
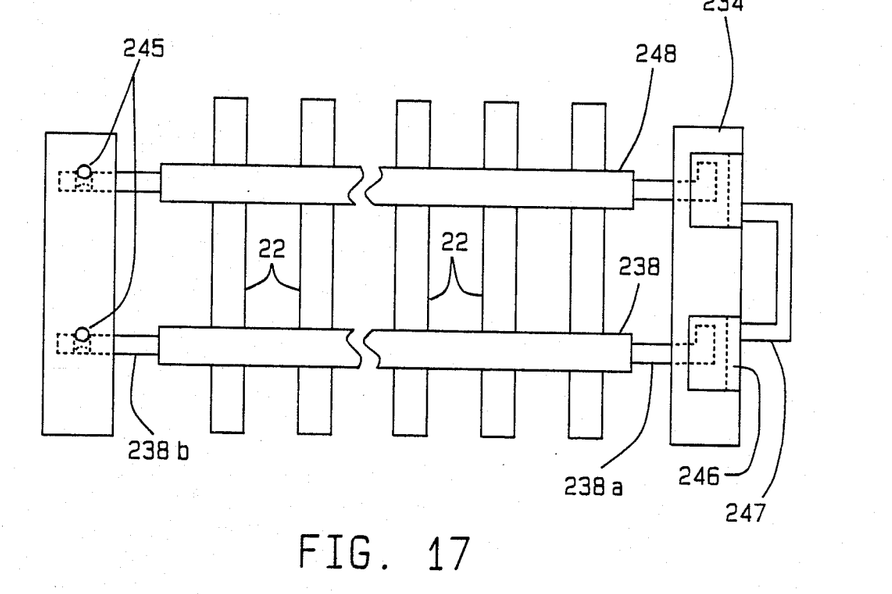
FIG. 17 is a simplified top planar view of the jet air tube support and positioning apparatus of FIG. 16.

Referring to FIGS. 16 and 17, there are respectively shown end on and top planar views of an SOFC positioning/insertion assembly 232. The positioning/insertion assembly 232 includes first and second side support frames 234 and 236. Positioned between the first and second side support frames 234, 236 are a plurality of rotatable vanes 238, 240, 242 and 244 as shown in FIG. 16. The aforementioned rotatable vanes are arranged in generally vertical alignment. One or more additional sets of vertically aligned vanes are also positioned between the first and second side support frames 234, 236 and coupled thereto as described below. The topmost rotatable vane in a second such set of vertically aligned vanes is shown as element No. 248 in FIG. 17.

Each of the rotatable vanes has extending from respective ends thereof first and second mounting/pivot members 238a and 238b. The first mounting/pivot member 238a is generally L-shaped and is inserted in a respective slot within the first side support frame 234. The first mounting/pivot member 238a is free to rotate within the first side support frame 234 and can be withdrawn from the side support frame only if in a particular rotational orientation therein because of the shape of the receiving slot in the side support frame. This "keying" effect permits each of the first mounting/pivot members 238a to be securely coupled to the first side support frame 234 during normal operation and use of the SOFC positioning/insertion assembly 232.

Each of the first mounting/pivot members 238a also extends outward from a respective end of a rotatable vane and is inserted within a respective slot in the first side support frame 234. Each of the first mounting/pivot members 238a includes an L-shaped end portion which is disposed within the first side support frame 234 and to which is connected a respective coupling member 246. A plurality of such coupling members 246 are positioned within respective slots within the first side support frame 234 and are freely displaceable in a linear manner therein. With the first mounting/pivot member 238a freely rotatable within the first side support frame 234 and the second mounting/pivot member 238b freely rotatable within the second side support frame 236, each of the vanes 238, 240, 242, 244 and 248 is freely rotatable within and between the first and second side support frames.

Oriented generally horizontally and coupled to adjacent ends of each of the coupling members 246 is a vane control handle 247. Displacement of the vane control handle 247 in a linear manner with the first side support causes either clockwise or counterclockwise rotation of each of the first mounting/pivot members 238a and rotating vanes coupled thereto. As shown in FIG. 16, each of the rotatable vanes 238, 240, 242 and 244 is oriented generally vertically. Each of the aforementioned rotatable vanes has a plurality of notches 250 arranged in a spaced manner along the length thereof. The upper and lower edges of each of the aforementioned rotatable vanes are provided with a plurality of such spaced notches, although they may be omitted from the top and bottom rotatable vanes of a given vertical array of such vanes as shown in FIG. 16. The notches 250 in each of the rotatable vanes are in vertical alignment as shown in FIG. 16, and each facing pair of notches is adapted to receive and engage a respective jet air tube 22 at some point along the length thereof. A plurality of such vertically arranged rotatable vanes provides support for a large number of jet air tubes 22 along the entire length of each of the tubes.

When the rotatable vanes are oriented generally vertically as shown in FIG. 16, each of the jet air tubes tubes 22 is securely supported and engaged by an upper and lower rotatable vane. The spacing of the slots 250 within the rotatable vanes is in alignment with a plurality of SOFC tubes arranged in a matrix as previously described. Therefore, with each of the jet air tubes 22 securely maintained in position by a pair of facing slots wiLhin the rotatable vanes, the combination of jet air tubes and the positioning/insertion assembly 232 is moved in position adjacent to and in alignment with a matrix of SOFC tubes. All of the jet air tubes 22 may then be inserted in unison within respective ones of the SOFC tubes arranged in the matrix. In this manner, a plurality of SOFC tubes arranged in virtually any sized matrix may be easily and quickly provided with jet air tube inserts therein. After the jet air tubes 22 have been inserted within the SOFC tubes, the rotatable vanes are rotationally displaced so as to release the jet air tubes from the positioning/insertion assembly 232 which allows the assembly to be removed from the SOFC tube matrix. The positioning/insertion assembly 232 is used to position at least the ends of each of the jet air tubes 22 within respective ones of the SOFC tubes and is then removed from the SOFC matrix. The jet air tubes 22 can then be fully inserted within the SOFC tubes by engaging the distal ends of the jet air tubes by conventional means and displacing the jet air tubes within and along the SOFC tubes.

There has thus been shown an improved means and method for assembling solid oxide fuel cells. The present invention facilitates simultaneous insertion of a plurality of jet air tubes within respective ones of a plurality of SOFC tubes arranged in a matrix. The present invention also facilitates the arranging of SOFC tubes or conductive interconnecting pads in a compact matrix array for high power density and good electrical conductivity without damaging the fragile SOFC tubes or impairing their electrical performance. Means are also disclosed for electrically coupling adjacent SOFC modules arranged in a vertically stacked array which accommodates thermal expansion of the SOFC modules at their high operating temperatures and eliminates the possibility of SOFC module damage caused by this expansion.

While particular embodiments of the present invention have been shown and described, it will be obvious to those skilled in the art that changes and modifications may be made without departing from the invention in its broader aspects. For example, while the present invention has been described in terms of square matrices of SOFC tubes, it is not limited to this SOFC tube arrangement as virtually any rectangular matrix of SOFC tubes may be used. In addition, the method of assembly can either be done in the vertical or horizontal mode. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method of assembling an SOFC module having a generally rectangular housing and a plurality of SOFC tubes disposed within said housing and electrically coupled in series and parallel by means of compressible conductive pads disposed therebetween, wherein each SOFC tube has a respective jet air tube disposed within and along the length thereof, said method comprising:
    arranging the SOFC tubes in a loose matrix array with a conductive pad disposed between and in contact with each adjacent pair of SOFC tubes;
    forming the SOFC tubes into a tight matrix by compressing each of the conductive pads disposed between adjacent SOFC tubes;
    inserting the tight matrix of SOFC tubes into the housing for maintaining the SOFC tube matrix compressed in a tight fitting matrix array; and
    inserting each of the jet air tubes into a respective one of the SOFC tubes in forming the SOFC module.

2. The method of claim 1 wherein the step of forming the SOFC tubes into a tight matrix includes displacing the SOFC tubes toward one another along orthogonal axes.

3. The method of claim 2 wherein the step of forming the SOFC tubes into a tight matrix further includes the steps of positioning a plurality of SOFC tubes about a tight matrix and compressing the pads between the outermost SOFC tubes and those SOFC tubes within the tight matrix in increasing the size of the matrix in a stepwise manner.

4. The method of claim 3 wherein the step of forming the SOFC tubes into a tight matrix is initiated with a 2×2 matrix of SOFC tubes, with the 2×2 matrix increased in size in a stepwise manner by alternately adding an outer layer of SOFC tubes to the matrix and compressing the pads between the SOFC tubes forming said outer layer and the tight matrix of SOFC tubes.

5. The method of claim 4 further comprising the step of maintaining each subsequently formed matrix in a tight, fixed configuration by positioning the SOFC tubes in a rigid frame disposed about the periphery of the matrix of SOFC tubes.

6. The method of claim 5 further comprising the step of increasing the dimensions of said rigid frame with each subsequently formed matrix to accommodate SOFC tube matrices of increasing size.

7. The method of claim 6 wherein the step of increasing the dimensions of said rigid frame includes using a plurality of rigid frames which increase in size in a stepwise manner with the formation of each successive, larger matrix of SOFC tubes 8. The method of claim 7 wherein each of said rigid frames has a square shape.

9. The method of claim 1 wherein the step of inserting the jet air tubes into respective SOFC tubes includes engaging and maintaining the jet air tubes in a matrix array, with each jet air tube in alignment with a respective one of said SOFC tubes as said jet air tubes are inserted therein.

10. The method of claim 9 further comprising the step of releasing each of the jet air tubes after each jet air tube is inserted in a respective SOFC tube.

11. The method of claim 10 wherein the step of inserting the jet air tubes into the SOFC tubes includes engaging and supporting the jet air tubes using a plurality of spaced, elongated support members disposed therebetween.

12. The method of claim 11 further comprising the steps of moving the support members to a first orientation for engaging and maintaining the jet air tubes in a matrix array and moving the support members to a second orientation for releasing the jet air tubes following their insertion in the SOFC tubes.

13. The method of claim 12 wherein the step of moving the support members between the first and second orientations includes pivotally displacing the support members.

14. The method of claim 13 further comprising the step of pivotally displacing the support members in unison.

* * * * *